(12) United States Patent
Benjamin et al.

(10) Patent No.: US 12,141,504 B2
(45) Date of Patent: Nov. 12, 2024

(54) TECHNIQUES FOR AUTOMATICALLY ANALYZING COMPETING DESIGN OBJECTIVES WHEN GENERATING DESIGNS FOR URBAN DESIGN PROJECTS

(71) Applicant: AUTODESK, INC., San Francisco, CA (US)

(72) Inventors: David Benjamin, New York, NY (US);
James Stoddart, New York, NY (US);
Lorenzo Villaggi, New York, NY (US);
Danil Nagy, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 572 days.

(21) Appl. No.: 16/184,972

(22) Filed: Nov. 8, 2018

(65) Prior Publication Data
US 2019/0147118 A1 May 16, 2019

Related U.S. Application Data

(60) Provisional application No. 62/584,711, filed on Nov. 10, 2017.

(51) Int. Cl.
*G06F 30/13* (2020.01)
*G06N 3/126* (2023.01)
(Continued)

(52) U.S. Cl.
CPC ............. *G06F 30/13* (2020.01); *G06N 3/126* (2013.01); *G06Q 10/06313* (2013.01);
(Continued)

(58) Field of Classification Search
CPC ...................................................... G06F 30/13
See application file for complete search history.

(56) References Cited

U.S. PATENT DOCUMENTS 7,164,883 B2 * 1/2007 Rappaport ............. G06Q 10/10
455/3.01
9,697,326 B1 7/2017 Bowman et al.
(Continued)

FOREIGN PATENT DOCUMENTS

CN 1381660 A 11/2002
CN 2895621 Y 5/2007
(Continued)

OTHER PUBLICATIONS

Zhongming Shi, Jimeno A. Fonseca, Arno Schlueter; A review of simulation-based urban form generation and optimization for energy-driven urban design ; Building and Environment 121 (2017)—(Year: 2017).*

(Continued)

*Primary Examiner* — Akash Saxena
(74) *Attorney, Agent, or Firm* — Artegis Law Group, LLP

(57) ABSTRACT

An urban design pipeline is configured to automatically generate design options that meet competing design objectives. A geometry engine within the urban design pipeline generates candidate designs for an urban design project. An evaluation engine within the urban design pipeline evaluates the degree to which each candidate design addresses the competing design objectives to produce a set of design metrics. A tradeoff engine within the urban design pipeline generates a design tradeoff space based on the candidate designs and corresponding design metrics. The tradeoff engine traverses the design tradeoff space based on performance modifications to adjust the degree to which the competing design objectives are addressed. The performance modifications can be obtained from any number of stakeholders in the urban design project. In this manner, the urban design pipeline generates and/or modifies candidate designs to generate design options that balance competing (Continued)

design objectives that potentially originate from multiple stakeholders.

20 Claims, 5 Drawing Sheets

(51) Int. Cl.
```
G06Q 10/0631      (2023.01)
G06Q 40/12        (2023.01)
G06Q 50/16        (2012.01)
G06T 15/00        (2011.01)
G06T 17/05        (2011.01)
G06F 3/04815      (2022.01)
G06F 3/04847      (2022.01)
G06F 111/02       (2020.01)
G06F 111/04       (2020.01)
G06F 111/06       (2020.01)
G06F 111/20       (2020.01)
```

(52) U.S. Cl.
CPC .......... G06Q 40/12 (2013.12); G06Q 50/165 (2013.01); *G06F 3/04815* (2013.01); *G06F 3/04847* (2013.01); *G06F 2111/02* (2020.01); *G06F 2111/04* (2020.01); *G06F 2111/06* (2020.01); *G06F 2111/20* (2020.01); *G06T 15/005* (2013.01); *G06T 17/05* (2013.01)

(56) References Cited

U.S. PATENT DOCUMENTS

| | | | |
|---|---|---|---|
| 10,074,145 B2 | 9/2018 | Budlong | |
| 10,255,383 B2* | 4/2019 | Gavini | E01C 1/00 |
| 10,452,790 B2* | 10/2019 | Kim | G06F 30/13 |
| 10,747,913 B2* | 8/2020 | Iorio | G06F 30/00 |
| 10,885,236 B2* | 1/2021 | Cheong | G06F 30/17 |
| 11,144,681 B2* | 10/2021 | Benjamin | G06F 30/13 |
| 11,275,872 B2* | 3/2022 | Benjamin | G06F 30/13 |
| 11,574,093 B2* | 2/2023 | Hoyer | G06F 30/23 |
| 11,593,533 B2* | 2/2023 | Grossman | G06F 30/00 |
| 2004/0143428 A1 | 7/2004 | Rappaport et al. | |
| 2005/0108982 A1 | 5/2005 | Formisano | |
| 2006/0294062 A1* | 12/2006 | Folchetti | G06Q 30/00 |
| 2010/0058268 A1* | 3/2010 | Fein | G06F 30/13 716/122 |
| 2010/0106674 A1 | 4/2010 | McLean et al. | |
| 2010/0217565 A1 | 8/2010 | Wayne et al. | |
| 2012/0173209 A1* | 7/2012 | Krebs | G06F 30/13 703/1 |
| 2012/0271784 A1* | 10/2012 | McLean | G06Q 10/103 706/45 |
| 2012/0330621 A1* | 12/2012 | Detwiler | G06F 30/13 703/1 |
| 2013/0132440 A1 | 5/2013 | Carlson et al. | |
| 2014/0107851 A1* | 4/2014 | Yoon | F24F 11/30 700/291 |
| 2014/0278280 A1* | 9/2014 | Pardo-Fernandez | G06F 30/13 703/1 |
| 2014/0355463 A1 | 12/2014 | Smith et al. | |
| 2015/0066442 A1 | 3/2015 | Pryor | |
| 2019/0147116 A1* | 5/2019 | Benjamin | G06Q 10/06313 703/1 |
| 2019/0147117 A1* | 5/2019 | Benjamin | G06Q 50/165 703/1 |
| 2019/0147118 A1* | 5/2019 | Benjamin | G06N 3/126 703/1 |
| 2019/0147119 A1* | 5/2019 | Benjamin | G06F 30/13 703/1 |
| 2019/0147120 A1 | 5/2019 | Benjamin et al. | |
| 2019/0325086 A1* | 10/2019 | Grossman | G06F 30/00 |
| 2019/0347080 A1* | 11/2019 | Benjamin | G06F 30/20 |
| 2020/0013127 A1* | 1/2020 | Gozes | G06Q 10/063118 |
| 2020/0210533 A1* | 7/2020 | Markiz | G06F 30/13 |
| 2021/0150083 A1* | 5/2021 | Benjamin | G06F 30/13 |
| 2021/0150084 A1* | 5/2021 | Benjamin | G06F 30/20 |
| 2021/0150085 A1* | 5/2021 | Benjamin | G06F 30/12 |
| 2021/0241864 A1* | 8/2021 | Bhattacharya | G06F 30/20 |
| 2022/0198087 A1* | 6/2022 | Benjamin | G06F 30/13 |

FOREIGN PATENT DOCUMENTS

| | | |
|---|---|---|
| CN | 100452071 C | 1/2009 |
| CN | 101782399 A | 7/2010 |
| CN | 101545321 B | 12/2010 |
| CN | 102368309 A | 3/2012 |
| CN | 102663800 A | 9/2012 |
| CN | 102750411 A | 10/2012 |
| CN | 103020741 A | 4/2013 |
| CN | 102521443 B | 5/2013 |
| CN | 104631243 A | 5/2015 |
| CN | 105205283 A | 12/2015 |
| CN | 105761192 A | 7/2016 |
| CN | 105825003 A | 8/2016 |
| CN | 105894553 A | 8/2016 |
| CN | 106251020 A | 12/2016 |
| CN | 106446000 A | 2/2017 |
| CN | 106599332 A | 4/2017 |
| CN | 106909986 A | 6/2017 |
| CN | 106952330 A | 7/2017 |
| CN | 107016221 A | 8/2017 |
| CN | 107133900 A | 9/2017 |
| JP | 2012-518838 A | 8/2012 |
| KR | 20110054221 A | 5/2011 |
| KR | 10-1173158 B1 | 9/2012 |
| WO | 00/00919 A1 | 1/2000 |
| WO | 00/57004 A1 | 9/2000 |
| WO | 01/67372 A1 | 9/2001 |
| WO | 2005069174 A1 | 7/2005 |
| WO | 2006/088550 A2 | 8/2006 |
| WO | 2007/073641 A1 | 7/2007 |
| WO | 2011/035542 A1 | 3/2011 |
| WO | 2013/161824 A1 | 10/2013 |

OTHER PUBLICATIONS

Martins, T. A. L., Adolphe, L., & Bastos, L. E. G. (2014). From solar constraints to urban design opportunities: Optimization of built form typologies in a brazilian tropical city. Energy and Buildings, 76, 43-56. doi:http://dx.doi.org/10.1016/j.enbuild.2014.02.056— (Year: 2014).*

Javier Urquizo et al.; Metrics of urban morphology and their impact on energy consumption: A case study in the United Kingdom; Energy Research & Social Science 32 (2017) 193-206 (Year: 2017).*

R. Timothy Marler • Jasbir S. Arora; The weighted sum method for multi-objective optimization: new insights; Struct Multidisc Optim (2010) 41:853-862 DOI 10.1007/s00158-009-0460-7 (Year: 2009).*

ArcGIS—Wikipedia, the free encyclopedia see page https://en.wikipedia.org/wiki/ArcGIS printed in 2016 pp. 9 (Year: 2016).*

Wikipedia Entry for ModeFrontier; https://en.wikipedia.org/wiki/ModeFRONTIER, pp. 1, 2021. (Year: 2021).*

Modefrontier incorporates CAD tools; https://engineering.esteco.com/technology/simulation-process-integration-automation/, 4 Pages showing ModeFrontier being integrated with CAD Applications (see p. 1,3). (Year: 2021).*

J. Beir~ao, CItyMaker. Designing grammars for urban design, ABE Archit. Built Environ. 2 (5) (Oct. 2012) 1-440. As cited in Shi (full text included) pp. 276. (Year: 2012).*

Shi et al., "A review of Simulation-Based Urban form Generation and Optimization for Energy-Driven Urban Design", Building and Environment, vol. 121, May 9, 2017, pp. 119-129.

Aliaga et al., "Interactive Example-Based Urban Layout Synthesis", ACM Transactions on Graphics (TOG), ACM, US, vol. 27, No. 5, Article 160, Dec. 1, 2008, pp. 1-10.

International Search Report for application No. PCT/US2018/060189 dated Aug. 8, 2019.

(56) References Cited

OTHER PUBLICATIONS

Anonymous: "Grid plan—Wikipedia", URL:https://en.wikipedia.org/w/index.php?title=Grid plan&oldid=808141305, Nov. 1, 2017, pp. 1-19.
Wang et al., "Restructuring surface tessellation with irregular boundary conditions", Frontiers of Architectural Research, vol. 3, No. 4, Dec. 1, 2014, pp. 337-347.
Martin et al., From solar constraints to urban design opportunities: Optimization of built form typologies in a Brazilian tropical city, pp. 43-56.
Parish et al., "Procedural Modeling of Cities", ACM SIGGRAPH 2001, pp. 301-308.
Erreira et al., "Urbane: A 3D Framework to Support Data Driven Decision Making in Urban Development", IEEE Conference on Visual Analytics Science and Technology 2015, pp. 97-104.
"Sven Schneider: ""Automatisierte Erzeugung raumlicher Konfigurationen in Architekturund Stadtebau auf Basis-sichtbarkeitsbasierter Raumreprasentationen Dissertation""", May 31, 2016, pp. 105-169."
Non Final Office Action received for U.S. Appl. No. 17/343,566 dated May 2, 2023, 47 pages.
Non Final Office Action received for U.S. Appl. No. 17/342,309 dated May 1, 2023, 44 pages.
Non Final Office Action received for U.S. Appl. No. 17/531,622 dated May 19, 2023, 44 pages.
Notice of Allowance received for U.S. Appl. No. 17/343,566 dated Aug. 16, 2023, 15 pages.
Non Final Office Action received for U.S. Appl. No. 17/342,309 dated Aug. 25, 2023, 12 pages.
Final Office Action received for U.S. Appl. No. 17/531,622 dated Aug. 28, 2023, 14 pages.
Hartmann et al., "Content-Aware Re-targeting of Discrete Element Layouts", Hartmann, WSCG 2015 Conference on Computer Graphics, Visualization and Computer Vision, pp. 173-182.
Shen et al., "Urban function connectivity: Characterisation of functional urban streets with social media check-in data", Jun. 2016, pp. 9-21.
Parish et al., "Procedural Modeling of Cities", ACM SIGGRAPH 2001, pp. 301-308. Aug. 12-17, 2001.
Notice of Allowance received for U.S. Appl. No. 16/181,224 dated Jun. 9, 2021, 112 pages.
Notice of Allowance received for U.S. Appl. No. 16/184,975, dated Jul. 16, 2021, 120 pages.
Notice of Allowance received for U.S. Appl. No. 16/182,557, dated Oct. 26, 2021, 143 pages.
Final Office Action received for U.S. Appl. No. 17/342,309 dated Dec. 13, 2023, 17 pages.
Non Final Office Action received for U.S. Appl. No. 17/693,920 dated Jan. 19, 2024, 64 pages.
Notice of Allowance received for U.S. Appl. No. 17/531,622 dated Jan. 26, 2024, 21 pages.
Non Final Office Action received for U.S. Appl. No. 17/342,309 dated Mar. 28, 2024, 21 pages.
Final Office Action received for U.S. Appl. No. 17/693,920 dated May 31, 2024, 49 pages.
Notice of Allowance received for U.S. Appl. No. 16/184,974 dated Mar. 15, 2021, 16 pages.
Partial Search Report for application No. PCT/US2018/060189 dated Apr. 8, 2019.
Shi et al., "A review of Simulation-Based Urban form Generation and Optimization for Energy-Driven Urban", Building and Environment, vol. 121, May 9, 2017, pp. 119-129.
Yusuf, Syed Adnan, "An Evolutionary AI-Based Decision Support System for Urban Regeneration Planning", URL: https://core.ac.uk/download.pdf/40034719.pdf, Chapters 5-7, Mar. 1, 2010, pp. 155-235.
Aliaga et al., "Interactive Example-Based Layout Synthesis", ACM Transactions on Graphics (TOG), ACM, US, vol. 27, No. 5, Article 160, Dec. 1, 2008, pp. 1-10.
Notice of Allowance received for U.S. Appl. No. 16/184,974 dated Jun. 17, 2021, 147 pages.
Anynoymous: "Grid plan—Wikipedia", URL:https://en.wikipedia.org/w/index.php?title=Grid plan&oldid=808141305, Nov. 1, 2017, pp. 1-19.
Wang et al., "Restructing surface tessellation with irregular boundary conditions", Frontiers of Architectural Research, vol. 3, No. 4, Dec. 1, 2014, pp. 337-347.
Non-Final Office Action received for U.S. Appl. No. 16/184,975, dated Mar. 24, 2021, 27 pages.
Vanegas et al., "Visualization of Simulated Urban Spaces: Inferring Parameterized Generation of Streets, Parcels, and Aerial Imagery", IEEE May 2009, pp. 424-435.
Hartman et al., "Content-Aware Re-targeting of Discrete Element Layouts", Hartman, WSCG 2015 Conference on Computer Graphics, Visualization and Computer Vision, pp. 173-182.
Sosa et al., "Urban grid forms as a strategy for reducing heat island effects in arid cities", Sustainable Cities and Society, Jul. 2017, pp. 547-556.
Lezama et al., "Vanishing Point Detection in Urban Scenes Using Point Alignments", Image Processing On Line on Jul. 14, 2017, pp. 131-164.
Shen et al., "Urban function connectivity: Characterisation of function urban streets with social media check-in data", Jun. 2016, pp. 9-21.
Oshima et al., "Geometry reconstruction and mesh generation techniques for acoustic simulations over real-life urban areas using digital geographic information", Acoust. Sci. & Tech. 35,2014, pp. 108-118.
Notice of Allowance received for U.S. Appl. No. 16/181,224 dated Mar. 3, 2021, 13 pages.
Martin et al., From solar constraints to urban design opportunities: Optimization of built form typologies in a Brazilian tropical city, pp. 43-56, Mar. 4, 2014.
Parish et al., "Procedural Moedling of Cities", ACM SIGGRAPH 2001, pp. 301-308, Aug. 12-17, 2001.
Ferreira et al., "Urbane: A 3D Framework to Support Data Driven Decision Making in Urban Development", IEEE Conference on Visual Analytics Science and Technology 2015, pp. 97-104.
Gracik et al., "Effect of urban neighborhoods on the performance of building cooling Systems", Stefan Gracik et al., Building and Environment, Mar. 2015, pp. 15-29.
Chang et al., "Legible Simplification of Textured Urban Models", Remco Chang et al, IEEE Computer Graphics and Applications, 2008, pp. 27-36.
International Search Report for application No. PCT/US2018/060151 dated Mar. 8, 2019.
"Sven Schenider ""Automatisierte Erzugung raumlicher Konfigurationen in Architekturund Stadtebau auf Basissichtarkeitsbasierter Raumreprasentationen Dissertation""", May 31, 2016, pp. 105-169."
Notice of Allowance received for U.S. Appl. No. 17/342,309 dated Jul. 19, 2024, 18 pages.

\* cited by examiner

TECHNIQUES FOR AUTOMATICALLY ANALYZING COMPETING DESIGN OBJECTIVES WHEN GENERATING DESIGNS FOR URBAN DESIGN PROJECTS

CROSS-REFERENCE TO RELATED APPLICATIONS

This application claims the priority benefit of United States provisional patent application titled, "Generative Design Techniques for Urban and Neighborhood Planning," filed on Nov. 10, 2017 and having Ser. No. 62/584,711. The subject matter of this related application is hereby incorporated herein by reference.

BACKGROUND

Field of the Various Embodiments

Embodiments of the present invention relate generally to computer-aided design technology and, more specifically, to techniques for automatically analyzing competing design objectives when generating designs for urban design projects.

DESCRIPTION OF THE RELATED ART

In a typical urban design project, a designer generates a design for developing a property. For example, the designer could plan the placement and organization of a number of houses to be built within a housing subdivision. The designer typically generates each design by manually and/or mentally making a number of design choices based on various design criteria and design objectives associated with the urban design project. A given design criterion could indicate, for example, a number of apartment units that should be built. A given design objective could indicate, for example, that population density should be maximized. As a general matter, designers rely on intuition and experience when making the various design choices involved with the traditional design process.

Most urban design projects are driven by multiple competing design objectives. For example, a design project associated with a neighborhood could be driven by a first design objective where population should be maximized as well as a second design objective where traffic congestion should be minimized. These two design objectives would tend to compete with one another because adding to the population of a neighborhood typically would increase the number of cars driving through the neighborhood, which likely would result in increased traffic congestion. When making the various design choices during the traditional design process discussed above, a designer typically makes tradeoffs between competing design objectives in an effort to generate designs that adequately address the various competing concerns reflected in those design objectives. For example, the designer could generate a neighborhood design that achieves a denser population but also includes a street layout designed to reduce traffic congestion. As a general matter, designers rely on intuition and experience when making tradeoffs between competing design objectives during the traditional design process. This approach suffers from at least two drawbacks.

First, urban design projects are usually driven by so many competing design objectives that designers oftentimes become overwhelmed and fail to make balanced tradeoffs between those competing design objectives. For example, the designer could fail to make a balanced tradeoff between population density and traffic congestion and generate a neighborhood design that includes numerous high-density apartment buildings but lacks the roadways needed to reduce traffic congestion.

Second, urban design projects are typically driven by competing design objectives derived from different stakeholders, which can complicate the process of making tradeoffs between various design objectives. For example, the designer could be tasked with maximizing population density in order to achieve a target profit level set by the owner of the property and also be tasked with minimizing traffic congestion to appease environmentally-friendly potential occupants. In order to make a balanced tradeoff between these two design objectives, the designer would need to coordinate with both parties, which can add complexity to an already complex decision-making process.

As the foregoing illustrates, what is needed in the art are more effective techniques for quantitatively analyzing competing design objectives when generating designs for urban design projects.

SUMMARY

Various embodiments include a computer-implemented method for generating designs for an urban design project via a computer-aided design (CAD) application, including generating, via a tradeoff engine included in the CAD application, a design tradeoff space that includes a plurality of candidate designs positioned along multiple dimensions within the design tradeoff space based on different sets of design metrics, determining, via the tradeoff engine, a first set of performance modifications based on one or more user interactions, wherein the first set of performance modifications indicates changes that, when applied to a first set of design metrics associated with a first candidate design, produce a second set of design metrics, traversing, via the tradeoff engine, the design tradeoff space from the first candidate design to a second candidate design based on the first set of performance modifications, wherein the second candidate design is associated with the second set of design metrics, generating, via the tradeoff engine, a first combined metric for the first candidate design based on the first set of metrics, and generating, via the tradeoff engine, a second combined metric for the second candidate design based on the second set of metrics, wherein the second combined metric is greater than the first combined metric, thereby indicating that the second candidate design is a higher ranked design than the first candidate design.

At least one technological advantage of the disclosed urban design pipeline is that design options are automatically generated that meet numerous competing design objectives. Accordingly, a designer can generate design options with minimal risk of failing to adequately balance those competing design objectives or failing to address any specific design objective

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

Figure 1:
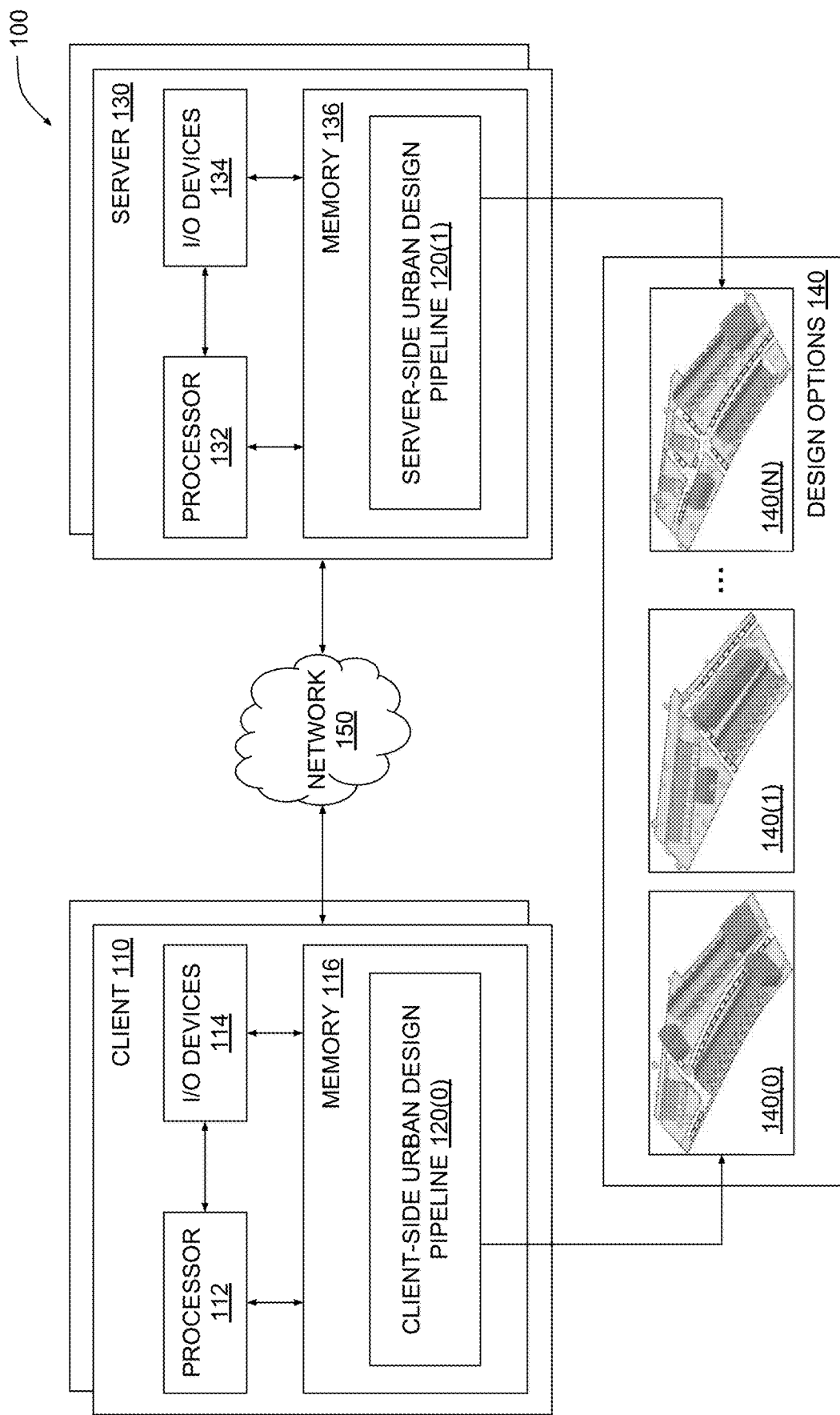
- FIG. 1 illustrates a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

As noted above, a designer usually implements a traditional design process when generating designs for an urban design project. In so doing, the designer manually and/or mentally makes a number of design choices in order to meet various design criteria and design objectives. Urban design projects are oftentimes driven by numerous competing design objectives the designer balances when making the design choices. However, with increasingly complex urban design projects, designers have to balance an exceedingly large number of competing design objectives. Consequently, designers sometimes fail to make balanced tradeoffs between competing design objectives and generate designs that neglect specific design objectives altogether. Furthermore, competing design objectives sometimes originate from different stakeholders in the urban design project, potentially placing the designer in the awkward position of having to negotiate between two different parties having contrary desires.

To address these issues, embodiments of the invention include an urban design pipeline configured to automatically generate design options that meet competing design objectives. A geometry engine within the urban design pipeline generates candidate designs for an urban design project. An evaluation engine within the urban design pipeline evaluates the degree to which each candidate design addresses the competing design objectives to produce a set of design metrics. A tradeoff engine within the urban design pipeline generates a design tradeoff space based on the candidate designs and corresponding design metrics. The tradeoff engine traverses the design tradeoff space based on one or more performance modifications to adjust the degree to which the competing design objectives are addressed. The performance modifications can be obtained from any number of stakeholders in the urban design project. In this manner, the urban design pipeline generates and/or modifies candidate designs to generate design options that balance competing design objectives that potentially originate from multiple stakeholders.

At least one technological advantage of the disclosed urban design pipeline is that design options are automatically generated that meet numerous competing design objectives. Accordingly, a designer can generate design options with minimal risk of failing to adequately balance those competing design objectives or failing to address any specific design objective. Another technological advantage is that the disclosed urban design pipeline automatically adjusts a set of candidate designs based on multiple performance modifications that can be obtained from different stakeholders in the urban design project. Thus, the designer is relieved from having to negotiate between stakeholders with contrary intentions for the urban design project. Additionally, the designer may later be able to structure discussions between stakeholders to identify mutually beneficial solutions that would otherwise be difficult or impossible to generate. These technological advantages represent multiple technological advancements relative to prior art approaches.

System Overview

FIG. 1 illustrates a system configured to implement one or more aspects of the present invention. As shown, a system 100 includes one or more clients 110 and one or more servers 130 configured to interoperate to generate a set of design options 140 for an urban design project. A given client 110 or a given server 130 may be any technically feasible type of computer system, including a desktop computer, a laptop computer, a mobile device, a virtualized instance of a computing device, a distributed and/or cloud-based computer system, and so forth. Clients 110 and servers 130 are coupled together via a network 150. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes client-side urban design pipeline 120(0). Client-side urban design pipeline 120(0) is a software application that, when executed by processor 112, causes processor 112 to participate in generating design options 140. In doing so, client-side urban design pipeline 120(0) interoperates with a corresponding client-side urban design pipeline 120(1) that resides within server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes server-side urban design pipeline 120(1). Server-side urban design pipeline 120(1) is a software application that, when executed by processor 132, causes processor 132 to participate in generating design options 140. In so doing, server-side urban design pipeline 120(1) interoperates with client-side urban design pipeline 120(0), as mentioned above.

In operation, one or more instances of client-side urban design pipeline 120(0) and one or more instances of server-side urban design pipeline 120(1) interoperate to generate multiple design options 140(0)-140(N). Each design option 140 describes a different development plan for developing a physical property to meet a set of competing design objectives. As a general matter, one or more client-side urban design pipelines 120(0) and one or more server-side urban design pipelines 120(1) collectively represent different portions of a distributed software entity. Thus, for simplicity, client-side urban design pipeline 120(0) and server-side urban design pipeline 120(1) will be collectively referred to herein as urban design pipeline 120. Urban design pipeline 120 is described in greater detail below in conjunction with FIG. 2.

Figure 2:
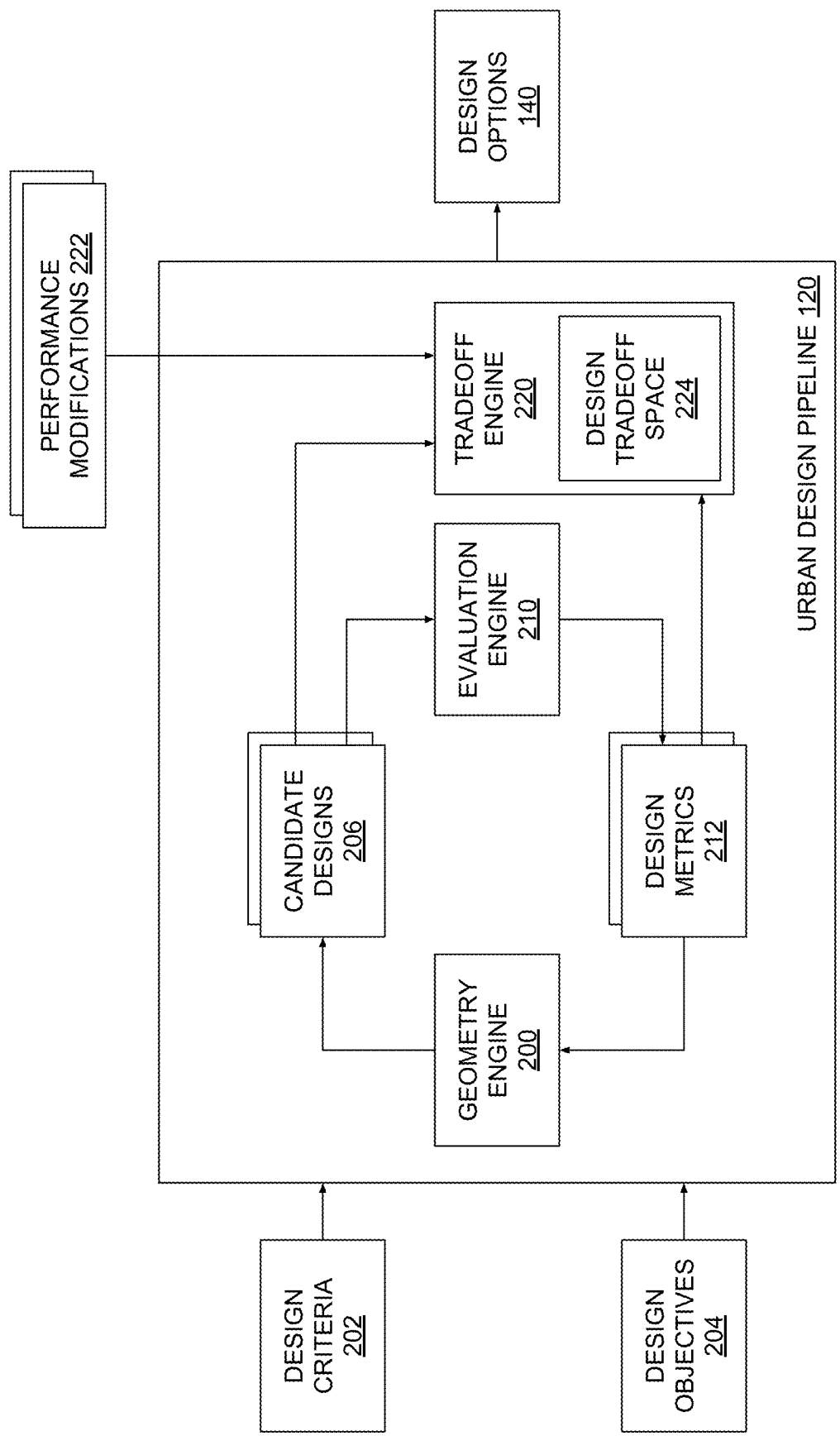
FIG. 2 is a more detailed illustration of the urban design pipeline of FIG. 1, according to various embodiments of the present invention.

FIG. 2 is a more detailed illustration of the urban design pipeline of FIG. 1, according to various embodiments of the present invention. As shown, urban design pipeline 120 includes a geometry engine 200, an evaluation engine 210, and a tradeoff engine 220. Geometry engine 200 and evaluation engine 210 are configured to perform an iterative process to generate candidate designs 206 based on design criteria 202 and design objectives 204. Tradeoff engine analyzes these candidate designs 206 based on performance modifications 222 to generate design options 140. Design options 140 represent feasible and well performing designs for the urban design project.

Design criteria 202 can include design constraints that generally describe features and/or attributes of designs that should be avoided when generating design options 140. A given design constraint could indicate, for example, regions of the physical property where the construction of structures cannot occur, a maximum number of floors for structures that cannot be exceeded, disallowed placement patterns for roadways, and so forth. Design constraints can be derived from local development regulations and/or building codes as well as directives received from one or more stakeholders in the urban design project.

Design criteria 202 can also include design requirements that generally describe features and/or attributes of designs that should be included within design options 140. A given design requirement could indicate, for example, one or more required orientations for structures, a number of parking lots needed for each structure, a target configuration for roadway intersections, and so forth. Design requirements can be derived from local development regulations and/or building codes as well as directives received from one or more stakeholders in the urban design project.

Design objectives 204 include a set of objective functions to be maximized or minimized when generating design options 140. A given objective function quantifies a specific attribute of a given design. In one embodiment, design objectives 204 may include objective functions that quantify solar energy collection, available sight lines associated with windows in structures, the size of yards associated with structures, the variety of neighborhoods, the distribution of programs, total project cost, and total project profit.

Design objectives 204 can include multiple competing design objectives. As described herein, any two or more design objectives are referred to as "competing" when increasing the degree to which one of those design options is optimized tends to decrease the degree to which another one of those design options is optimized. For example, design objectives 204 could include a first design objective indicating that profit should be maximized by any given candidate design 206, as well as a second design objective indicating that solar energy generation should be maximized by any given candidate design 206. These exemplary design objectives are considered "competing" because increasing profit for a given candidate design 206 would tend to increase the density with which structures are placed within the candidate design 206, thereby increasing roof shading and diminishing the ability of solar panels to generate solar energy. Conversely, increasing solar energy collection for the given candidate design 206 would tend to decrease the density with which structures are placed within the candidate design 206, thereby decreasing roof shading and enhancing the ability of solar panels to generate solar energy. As described in greater detail below, once geometry engine 200 and evaluation engine 210 generate candidate designs 206, tradeoff engine 220 analyzes candidate designs 206 and balances various competing design objectives against one another to produce design options 140.

In operation, geometry engine 200 receives design criteria 202 and design objectives 204 and generates candidate designs 206 for the urban design project. Each candidate design 206 describes a different development plan for developing the physical property with various structures, roadways, and other fixtures associated with the urban design project. A given candidate design 206 meets some or all design criteria 202 and is therefore generally considered a feasible design. Candidate designs 206 also achieve design objectives 204 to varying degrees, including any competing design objectives included therein. Evaluation engine 210 evaluates each candidate design 206 based on the objective functions included in design objectives 204 to generate design metrics 212. The design metrics 212 generated for a given candidate design 206 quantify the degree to which design objectives 204 are met by the given candidate design 206. In one embodiment, design metrics 212 may quantify the solar energy collection, available sight lines, yard size, neighborhood variety, program distribution, total project cost, and total project profit for the given candidate design 206.

Geometry engine 200 analyzes design metrics 212 in conjunction with candidate designs 206 and then regenerates and/or modifies candidate designs 206 to generate improved versions of candidate designs 206 that better achieve design objectives 204 while still meeting design criteria 202. In this fashion, geometry engine 200 and evaluation engine 210 complete one iteration of urban design pipeline 120. In a subsequent iteration, evaluation engine 210 generates design metrics 212 for these improved versions of candidate designs 206, and geometry engine 200 again regenerates and/or modifies candidate designs 206. In one embodiment, geometry engine 200 and evaluation engine 210 execute a multi-objective solver in order to generate and/or update candidate designs 206. Geometry engine 200 and evaluation engine 210 iteratively generate and modify candidate designs 206 until one or more convergence criteria are met. When the convergence criteria are met, urban design pipeline 120 outputs the resultant set of candidate designs 206 to tradeoff engine 220.

Figure 3A:
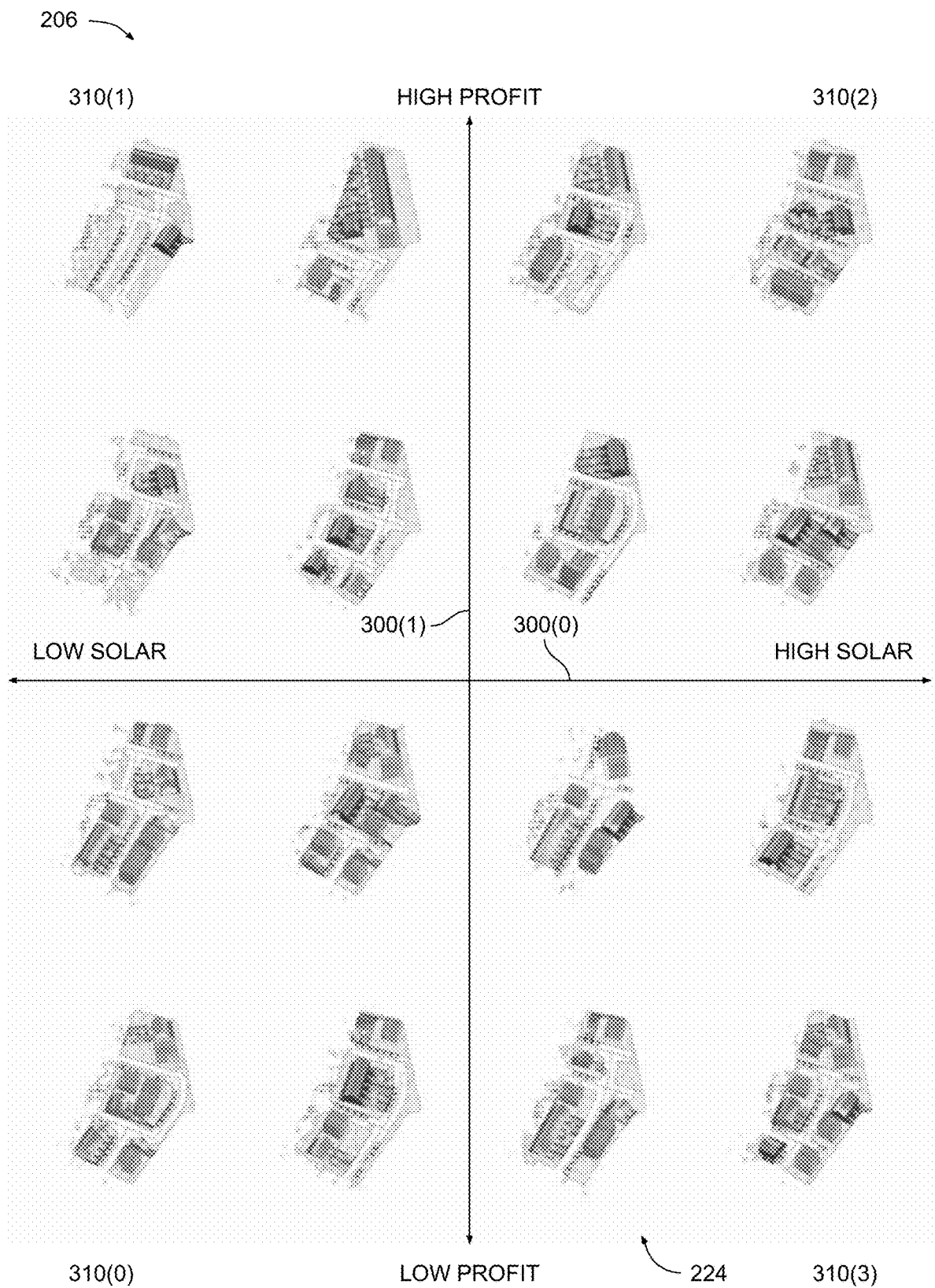
FIGS. 3A-3B illustrates how the tradeoff engine of FIG. 2 automatically analyzes and makes tradeoffs between competing design objectives, according to various embodiments of the present invention.

Tradeoff engine 220 is configured to analyze candidate designs 206 to determine specific candidate designs 206 that balance multiple competing design objectives better than others. In so doing, tradeoff engine 220 generates a design tradeoff space 224 based on candidate designs 206 and design metrics 212. Design tradeoff space 224 is a multidimensional space within which candidate designs 206 are positioned along multiple dimensions that correspond to the multiple competing design objectives. The position of a given candidate design 206 along a particular dimension depends on a corresponding design metric 212 that is generated to indicate the degree to which the given candidate design 206 meets a specific design objective 204. FIG. 3A illustrates an example of design tradeoff space 224 and is described in greater detail below.

Figure 3B:
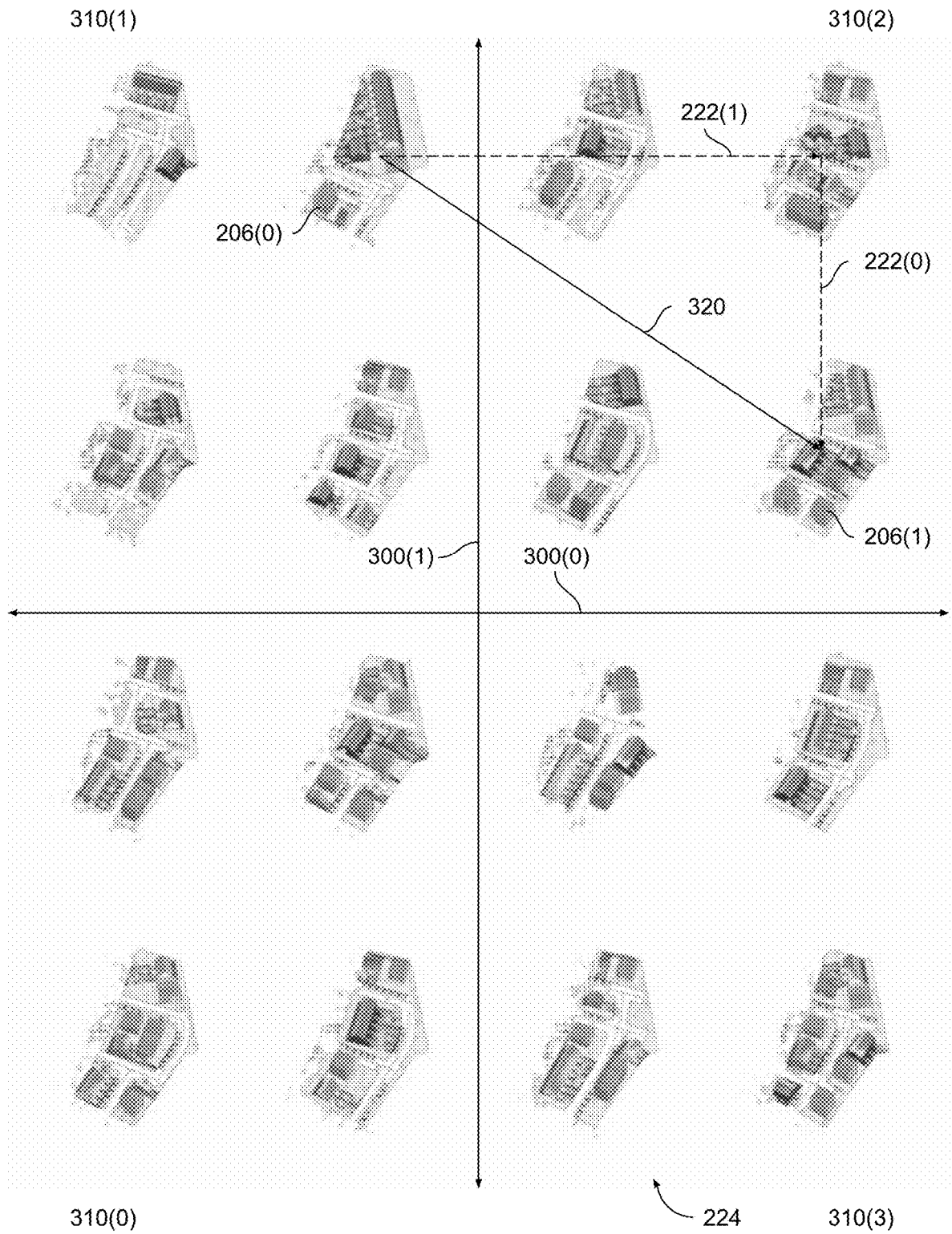

Tradeoff engine 220 is configured to traverse design tradeoff space 224 based on performance modifications 222 to identify specific candidate designs 206 which most effectively balance the set of competing design objectives. Performance modifications 222 specify ranges of acceptable changes in the performance of candidate designs 206 relative to the multiple competing design objectives. Performance modifications 222 can be obtained from different and potentially independent stakeholders in the urban design project. FIG. 3B illustrates an example of how tradeoff engine 220 traverses design tradeoff space 224 and is described in greater detail below.

Once tradeoff engine 220 traverses design tradeoff space 224 in the manner described, tradeoff engine 220 outputs the identified candidate designs 206 as design options 140. Under circumstances where tradeoff engine 220 cannot find candidate designs 206 that effectively balance the competing design objectives, tradeoff engine 220 can also re-initiate the iterative design process in order to cause geometry engine 200 and evaluation engine 210 to generate additional candidate designs 206.

One advantage of the approach described above is that candidate designs 206 can be generated to meet the various design objectives 204 to varying degrees, thereby avoiding situations where one or more design objectives are altogether neglected. Another advantage of the above-described approach is that candidate designs 206 are processed to identify those candidate designs 206 which effectively balance competing design objectives. Accordingly, design options 140 can be generated which equitably meet the potentially conflicting interests of different stakeholders.

Generating and Traversing Design Tradeoff Space

FIGS. 3A-3B illustrates how the tradeoff engine of FIG. 2 automatically analyzes and makes tradeoffs between competing design objectives, according to various embodiments of the present invention. As discussed above in conjunction with FIG. 2, geometry engine 200 and evaluation engine 210 interoperate to generate candidate designs 206 and design metrics 212 via an iterative design process. Tradeoff engine then generates design tradeoff space 224, an example of which is described below in conjunction with FIG. 3A.

Referring now to FIG. 3A, as shown, an exemplary design tradeoff space 224 includes a plurality of candidate designs 206 organized along different axes 300 that divide a two-dimensional space into quadrants 310(0), 310(1), 310(2), and 310(3). Axis 300(0) corresponds to a solar metric while axis 300(1) corresponds to a profit metric.

Tradeoff engine 220 generates design tradeoff space 224 by placing each candidate design 206 at positions along axes 300 based on the design metrics 212 corresponding to those candidate designs 206. As discussed, design metrics 212 include a solar metric and a profit metric for each different candidate design 206. The solar metric for a given candidate design 206 reflects the degree to which a design objective 204 quantifying solar energy generation is met, while the profit metric for the given candidate design 206 reflects the degree to which a design objective 204 quantifying profit is met.

Accordingly, when generating design tradeoff space 224, tradeoff engine 220 places candidate designs 206 with low solar metrics and low profit metrics into quadrant 310(0), candidate designs 206 with low solar metrics and high profit metrics into quadrant 310(1), candidate designs 206 high solar metrics and high profit metrics reside into quadrant 310(2), and candidate designs 206 high solar metrics and low profit metrics reside into quadrant 310(3).

Tradeoff engine 220 then traverses between different regions of design tradeoff space 224 in order to determine specific candidate designs 206 that balance solar power generation against profit to varying degrees. In particular, tradeoff engine 220 can execute discrete traversals of design tradeoff space 224 between different candidate designs 206 based on specific performance modifications 222. An example of how tradeoff engine 220 performs this technique is described in greater detail below in conjunction with FIG. 3B.

Referring now to FIG. 3B, as shown, tradeoff engine 220 traverses design tradeoff space 224 from an initial candidate design 206(0) to a final candidate design 206(1) via a traversal 320. Tradeoff engine 220 performs traversal 320 based on performance modifications 222(0) and 222(1). As mentioned above, performance modifications 222 indicate ranges of acceptable changes to the performance of candidate designs 206 that can be obtained from different stakeholders in the urban design project. The different stakeholders may have competing goals for the urban design project, as indicated in design objectives 204. Each stakeholder may be willing to sacrifice the degree to which these goals are achieved, though, as expressed via performance modifications 222.

For example, suppose a first stakeholder is primarily interested in profit and therefore favors candidate designs 206 that reside in quadrants 310(1) and 310(2). The first stakeholder could be, for example, an executive responsible for the financial success of the urban design project. Suppose also that a second stakeholder is primarily interested in solar power generation and therefore favors candidate designs 206 that reside in quadrants 310(2) and 310(3). During the iterative design process, geometry engine 200 and evaluation engine 210 could generate a candidate design 206(0) that meets design criteria 202 and addresses design objectives 204 to varying degrees, yet favors profit over solar power generation. In particular, as is shown, candidate design 206(0) resides in the high profit/low solar quadrant 310(1).

Tradeoff engine 220 would address this imbalance based on performance modifications 222 obtained from the first and second stakeholders. In the example shown, performance modification 222(0) would indicate that the first stakeholder is willing to sacrifice a portion of profit, while performance modification 222(1) would indicate that the second stakeholder prefers an increase in solar power generation. Tradeoff engine 220 analyzes these two performance modifications to generate traversal 320. In one embodiment, tradeoff engine 220 may generate a first vector within design tradeoff space 224 corresponding to modification 222(0) and generate a second vector within design tradeoff space 224 corresponding to modification 222(1). Traversal 320 spans a portion of design tradeoff space 224 between the relatively imbalanced candidate design 206(0) and the more balanced candidate design 206(1). Candidate design 206(1) resides in the high profit/high solar quadrant 310(2), and therefore equitably addresses the competing design objectives associated with the two stakeholders.

In one embodiment, tradeoff engine 220 may quantify the degree to which any given candidate design 206 balances the competing design metrics relative to other candidate designs 206 by generating a combined metric for each candidate design 206. Tradeoff engine 220 may generate the combined metric for a given candidate design 206 based on the position of that candidate design within design tradeoff space 224. For example, for a given candidate design 206, tradeoff engine 220 could compute a ratio between a first design metric that should be increased and a second design metric that should be decreased. Tradeoff engine 206 could perform the same process with other candidate designs, and then compare the various candidate designs to determine which design maximizes the computed ratio.

Referring generally to FIGS. 3A-3B, in various embodiments tradeoff engine 220 generates a graphical user interface (GUI) based on design tradeoff space 224. The GUI allows users to input design modifications 222 and observe how tradeoff engine 220 traverses design tradeoff space 224. For example, tradeoff engine 220 could generate various GUI elements that depict design tradeoff space 224 shown in FIG. 3A and further depict the various operations for traversing that design tradeoff space shown in FIG. 3B. This approach improves upon conventional techniques for generating candidate designs because the designer is provided with techniques that greatly simplify and streamline the otherwise difficult task of producing candidate designs which balance a set of competing design objectives.

As a general matter, tradeoff engine 220 can perform the above-described techniques with any technically feasible set of competing design objectives. Tradeoff engine 220 can also perform these techniques with multiple different combinations of competing design objectives in an iterative manner in order to identify candidate designs 206 that balance many different competing design objectives.

For example, suppose that the candidate designs 206 discussed above are also driven by the additional design constraint 204 that the area of parkland should be maximized. Maximizing the area of parkland competes with maximizing profit because increasing the area of parkland reduces the area available for housing. Similarly, maximizing the area of parkland competes with maximizing solar power generation because increasing the area of parkland reduces the area available to place solar panels. Tradeoff engine 220 could address this situation using at least two techniques.

In one embodiment, tradeoff engine 220 may generate multiple design tradeoff spaces 224 in order to analyze tradeoffs between different combinations of the three competing design objectives. For each design tradeoff space 224, tradeoff engine 220 may perform the techniques described above in conjunction with FIGS. 3A-3B to identify candidate designs 206 that balance the associated combination of competing design objectives based on a corresponding set of performance modifications 222. Performance modifications 222 associated with the additional design objective could be obtained from a third stakeholder, among others. Tradeoff engine 220 may analyze each design tradeoff space 224 to generate three different sets of candidate designs 206 and then identify any candidate designs 206 falling within all three sets. The identified candidate designs 206 may balance the three competing design objectives.

In another embodiment, tradeoff engine 220 generates a three-dimensional design tradeoff space populated with candidate designs 206 in order to analyze tradeoffs between all three competing design objectives. Each axis of the three-dimensional design tradeoff space corresponds to a different design metric 212 associated with a given one of the competing design objectives. Tradeoff engine 220 traverses the three-dimensional tradeoff space based on three performance modifications potentially obtained from three different stakeholders. Persons skilled in the art will understand how the techniques describe above in conjunction with FIGS. 3A-3B can be adapted from two dimensions to three dimensions.

The disclosed techniques advantageously provide designers with tools for automatically generating candidate designs 206 and design options 140 that meet multiple competing design objectives potentially provided by different stakeholders. These techniques are described in greater detail below in conjunction with FIG. 4.

Generating and Evaluating Competing Designs

Figure 4:
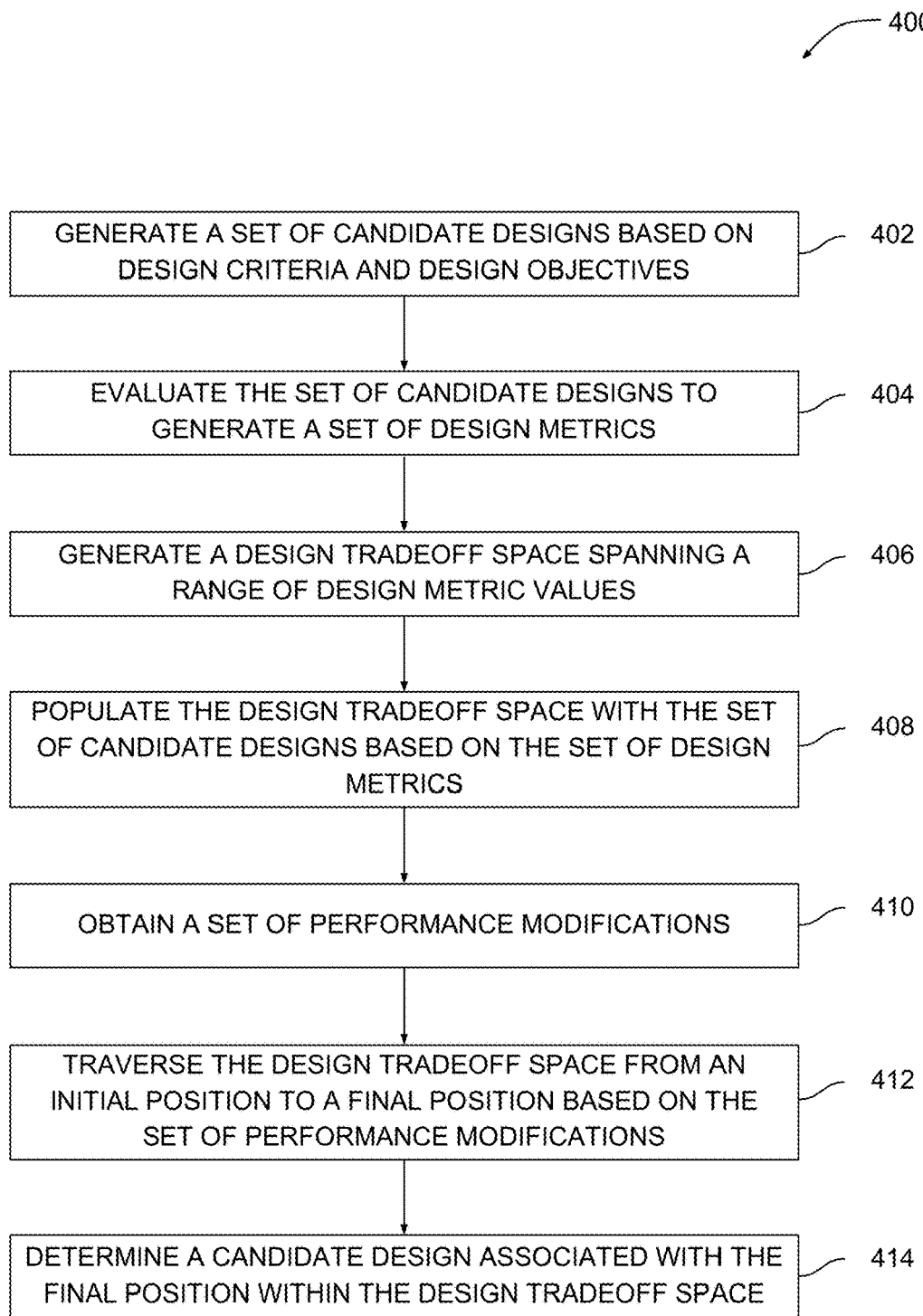
FIG. 4 is a flow diagram of method steps for automatically analyzing competing design objectives when generating designs for urban design projects, according to various embodiments of the present invention.

FIG. 4 is a flow diagram of method steps for automatically analyzing competing design objectives when generating designs for urban design projects, according to various embodiments of the present invention. Although the method steps are described in conjunction with the systems of FIGS. 1-3B, persons skilled in the art will understand that any system configured to perform the method steps in any order falls within the scope of the present invention.

As shown, a method 400 begins at step 402, where geometry engine 200 within urban design pipeline 120 generates a set of candidate designs based on design criteria and design objectives. The design criteria can include design constraints that describe features and/or attributes of designs that should be avoided when generating candidate designs. The design criteria can also include design requirements that describe features and/or attributes of designs that should be included within candidate designs. The design objectives include a set of objective functions that should be maximized or minimized when generating candidate designs, and generally include multiple competing design objectives. Geometry engine 200 shown in FIG. 2 generates the set of candidate designs based on the design criteria and design objectives. A given candidate design describes a different development plan for developing the physical property. Each candidate design generally meets the design criteria and addresses the design objectives to varying degrees, but some candidate designs can optimize certain design objectives better than others.

At step 404, evaluation engine 210 evaluates the set of candidate designs generated at step 402 to generate a set of design metrics. Evaluation engine 210 can generate a multitude of different metrics, including a solar energy collection metric, an available sight lines metric, a yard size metric, a neighborhood variety metric, a program distribution metric, a total project cost metric, and a total project profit metric, among others. Each metric generated by evaluation engine 210 quantifies the degree to which a particular design objective is met. Accordingly, specific metrics that are associated with competing design objectives may have inverse relationships with one another due to the competing nature of those design objectives.

At step 406, tradeoff engine 220 within urban design pipeline 120 generates a design tradeoff space spanning a range of metric values. The design tradeoff space generally includes at least two axes corresponding to at least two competing design objectives. Each axis spans a range of values for the design metric associated with the corresponding design objective. In some cases, tradeoff engine 220 generates a design tradeoff space with more than two axes in order to analyze three or more competing design objectives.

At step 408, tradeoff engine 220 populates the design tradeoff space generated at step 406 with the set of candidate designs generated at step 402 based on the set of design metrics generated at step 404. Conceptually, the design metrics generated for a given candidate design represent a set of coordinates in a multidimensional coordinate space. Tradeoff engine 220 can position the given candidate design within the design tradeoff space using the corresponding design metrics as coordinates.

At step 410, tradeoff engine 220 obtains a set of performance modifications. The performance modifications could be provided by the design or could be derived from one or more stakeholders in the urban design project, for example. A given performance modification generally indicates a range of acceptable or desirable changes to a particular design metric. For example, a performance modification associated with a yard size metric could indicate that a yard size reduction of 20% or less is acceptable. Alternatively, a performance metric associated with project cost could indicate that a cost reduction of 10% is required.

At step 412, tradeoff engine 220 traverses the design tradeoff space from an initial position to a final position based on the set of performance modifications. Each performance modification obtained at step 410 conceptually represents a traversal within one dimension of the design tradeoff space. Accordingly, tradeoff engine 220 can traverse the design tradeoff space in multiple dimensions by considering each performance modification separately.

At step 414, tradeoff engine 220 determines a candidate design associated with the final position within the design tradeoff space. The candidate design determined at step 414 balances the competing design objectives by addressing each such design objective more or less equally and may therefore be output as a design option. By implementing the method 400, stakeholders involved with the urban design project can be provided with candidate designs that meet diverse and potentially conflicting sets of design objectives.

In sum, an urban design pipeline is configured to automatically generate design options that meet competing design objectives. A geometry engine within the urban design pipeline generates candidate designs for an urban design project. An evaluation engine within the urban design pipeline evaluates the degree to which each candidate design addresses the competing design objectives to produce a set of design metrics. A tradeoff engine within the urban design pipeline generates a design tradeoff space based on the candidate designs and corresponding design metrics. The tradeoff engine traverses the design tradeoff space based on one or more performance modifications to adjust the degree to which the competing design objectives are addressed. The performance modifications can be obtained from any number of stakeholders in the urban design project. In this manner, the urban design pipeline generates and/or modifies candidate designs to generate design options that balance competing design objectives that potentially originate from multiple stakeholders.

At least one technological advantage of the disclosed urban design pipeline is that design options are automatically generated that meet numerous competing design objectives. Accordingly, a designer can generate design options with minimal risk of failing to adequately balance those competing design objectives or failing to address any specific design objective. Another technological advantage is that the disclosed urban design pipeline automatically adjusts a set of candidate designs based on multiple performance modifications that can be obtained from different stakeholders in the urban design project. Thus, the designer is relieved from having to negotiate between stakeholders with contrary intentions for the urban design project. These technological advantages represent multiple technological advancements relative to prior art approaches.

1. Some embodiments include a computer-implemented method for generating designs for an urban design project via a computer-aided design (CAD) application, the method comprising generating, via a tradeoff engine included in the CAD application, a design tradeoff space that includes a plurality of candidate designs positioned along multiple dimensions within the design tradeoff space based on different sets of design metrics, determining, via the tradeoff engine, a first set of performance modifications based on one or more user interactions, wherein the first set of performance modifications indicates changes that, when applied to a first set of design metrics associated with a first candidate design, produce a second set of design metrics, traversing, via the tradeoff engine, the design tradeoff space from the first candidate design to a second candidate design based on the first set of performance modifications, wherein the second candidate design is associated with the second set of design metrics, generating, via the tradeoff engine, a first combined metric for the first candidate design based on the first set of metrics, and generating, via the tradeoff engine, a second combined metric for the second candidate design based on the second set of metrics, wherein the second combined metric is greater than the first combined metric, thereby indicating that the second candidate design is a higher ranked design than the first candidate design.

2. The computer-implemented method of clause 1, further comprising generating, via a geometry engine included in the CAD application, the plurality of candidate designs, wherein each one of the candidate designs includes a geometrical layout for developing a region of land according to a first design criterion.

3. The computer-implemented method of any of clauses 1-2, wherein the first design criterion indicates a property boundary associated with the region of land within which construction is allowed to occur and outside of which construction is not allowed to occur.

4. The computer-implemented method of any of clauses 1-3, further comprising generating, via an evaluation engine included in the CAD application, a different set of design metrics for each candidate design included in the plurality of candidate designs based on a set of competing design objectives.

5. The computer-implemented method of any of clauses 1-4, wherein the competing set of design objectives includes a first objective function and a second objective function, and wherein an increase in value of the first objective function causes a decrease in value of the second objective function for a given candidate design.

6. The computer-implemented method of any of clauses 1-5, wherein generating the design tradeoff space comprises generating, via the tradeoff engine, multiple axes corresponding to the multiple dimensions, wherein each axis corresponds to a different competing design objective, and positioning, via the tradeoff engine, each candidate design within the design tradeoff space based on a corresponding set of design metrics.

7. The computer-implemented method of any of clauses 1-6, wherein determining the first set of performance modifications comprises determining a first decrease to a first design metric included in the first set of design metrics based on a first user interaction, and determining a first increase to a second design metric included in the first set of design metrics based on a second user interaction.

8. The computer-implemented method of any of clauses 1-7, wherein traversing the design tradeoff space comprises generating a first vector within the design tradeoff space based on a first performance modification included in the first set of performance modifications, wherein the first vector traverses along a first dimension in the multiple dimensions, generating a second vector within the design tradeoff space based on a second performance modification included in the first set of performance modifications, wherein the second vector traverses along a second dimension in the multiple dimensions, and generating a third vector that traverses along the first dimension and the second dimension within the design tradeoff space based on the first vector and the second vector.

9. The computer-implemented method of any of clauses 1-8, wherein the set of performance modifications indicates that the first design metric should be decreased and the second design metric should be increased.

10. The computer-implemented method of any of clauses 1-9, further comprising generating a graphical user interface (GUI) that includes the design tradeoff space, obtaining the first set of performance modifications via one or more user interactions with the GUI, and generating one or more GUI elements depicting how the design tradeoff space is traversed.

11. Some embodiments include a non-transitory computer-readable medium storing program instructions that, when executed by one or more processors, causes the one or more processors to generate designs for an urban design project via a computer-aided design (CAD) application by performing the steps of generating, via a tradeoff engine included in the CAD application, a design tradeoff space that includes a plurality of candidate designs positioned along multiple dimensions within the design tradeoff space based on different sets of design metrics, determining, via the tradeoff engine, a first set of performance modifications based on one or more user interactions, wherein the first set of performance modifications indicates changes that, when applied to a first set of design metrics associated with a first candidate design, produce a second set of design metrics, traversing, via the tradeoff engine, the design tradeoff space from the first candidate design to a second candidate design based on the first set of performance modifications, wherein the second candidate design is associated with the second set of design metrics, generating, via the tradeoff engine, a first combined metric for the first candidate design based on the first set of metrics, and generating, via the tradeoff engine, a second combined metric for the second candidate design based on the second set of metrics, wherein the second combined metric is greater than the first combined metric, thereby indicating that the second candidate design is a higher ranked design than the first candidate design.

12. The non-transitory computer-readable medium of clause 11, further comprising the step of generating, via a geometry engine included in the CAD application, the plurality of candidate designs, wherein each one of the candidate designs includes a geometrical layout for developing a region of land according to a first design criterion.

13. The non-transitory computer-readable medium of any of clauses 11-12, wherein the first design criterion indicates a property boundary associated with the region of land within which construction is allowed to occur and outside of which construction is not allowed to occur.

14. The non-transitory computer-readable medium of any of clauses 11-13, further comprising the step of generating, via an evaluation engine included in the CAD application, a different set of design metrics for each candidate design included in the plurality of candidate designs based on a set of competing design objectives.

15. The non-transitory computer-readable medium of any of clauses 11-14, wherein the competing set of design objectives includes a first objective function and a second objective function, and wherein an increase in value of the first objective function causes a decrease in value of the second objective function for a given candidate design.

16. The non-transitory computer-readable medium of any of clauses 11-15, wherein the step of generating the design tradeoff space comprises generating, via the tradeoff engine, multiple axes corresponding to the multiple dimensions, wherein each axis corresponds to a different competing design objective, and positioning, via the tradeoff engine, each candidate design within the design tradeoff space based on a corresponding set of design metrics.

17. The non-transitory computer-readable medium of any of clauses 11-16, wherein the step of determining the first set of performance modifications comprises determining a first decrease to a first design metric included in the first set of design metrics based on a first user interaction, and determining a first increase to a second design metric included in the first set of design metrics based on a second user interaction.

18. The non-transitory computer-readable medium of any of clauses 11-17, wherein the step of traversing the design tradeoff space comprises generating a first vector within the design tradeoff space based on a first performance modification included in the first set of performance modifications, wherein the first vector traverses along a first dimension in the multiple dimensions, generating a second vector within the design tradeoff space based on a second performance modification included in the first set of performance modifications, wherein the second vector traverses along a second dimension in the multiple dimensions, generating a third vector within the design tradeoff space based on a third performance modification included in the first set of performance modifications, wherein the third vector traverses along a third dimension in the multiple dimensions, and generating a fourth vector that traverses along the first dimension, the second dimension, and the third dimension within the design tradeoff space based on the first vector, the second vector, and the third vector, wherein the set of performance modifications indicates that the first design metric and the second design metric should be decreased and the third design metric should be increased.

19. The non-transitory computer-readable medium of any of clauses 11-18, further comprising generating a graphical user interface (GUI) that includes the design tradeoff space, obtaining a first performance modification via a first user interaction with the GUI, obtaining a second performance modification via a second user interaction with the GUI, generating a first GUI element based on the first performance modification, and generating a second GUI element based on the second performance modification, wherein the first GUI element and the second GUI element depict how the design tradeoff space is traversed.

20. Some embodiments include a system, comprising a memory storing a computer-aided design (CAD) application, and one or more processors that, when executing the CAD application, are configured to perform the steps of generating, via a tradeoff engine included in the CAD application, a design tradeoff space that includes a plurality of candidate designs positioned along multiple dimensions within the design tradeoff space based on different sets of design metrics, determining, via the tradeoff engine, a first set of performance modifications based on one or more user interactions, wherein the first set of performance modifications indicates changes that, when applied to a first set of design metrics associated with a first candidate design, produce a second set of design metrics, traversing, via the tradeoff engine, the design tradeoff space from the first candidate design to a second candidate design based on the first set of performance modifications, wherein the second candidate design is associated with the second set of design metrics, generating, via the tradeoff engine, a first combined metric for the first candidate design based on the first set of metrics, and generating, via the tradeoff engine, a second combined metric for the second candidate design based on the second set of metrics, wherein the second combined metric is greater than the first combined metric, thereby indicating that the second candidate design is a higher ranked design than the first candidate design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for an urban design project via a computer-aided design (CAD) application, the method comprising:

generating, via a geometry engine included in the CAD application, a plurality of candidate designs based on a set of design criteria and a set of competing design objectives;

generating, via a tradeoff engine included in the CAD application, a design tradeoff space that includes the plurality of candidate designs having values associated with multiple dimensions within the design tradeoff space based on different sets of design metrics, wherein each design metric included in the different sets of design metrics quantifies a degree to which a corresponding design objective is met, and wherein a first graphical user interface can be used to visualize two dimensions of the multiple dimensions at a given time;

receiving a first set of performance modifications specifying one or more changes to one or more of the degrees to which one or more design objectives included in the set of competing design objectives are met;

traversing, via the tradeoff engine, the design tradeoff space from a first position in the design tradeoff space associated with a first set of degrees to which the one or more design objectives are met for a first candidate design included in the plurality of candidate designs to a second position in the design tradeoff space associated with a second set of degrees to which the one or more design objectives are met based on the first set of performance modifications;
generating a second candidate design not included in the plurality of candidate designs based on the second position in the tradeoff space;
generating, via the tradeoff engine, a first combined metric for the first candidate design based on a first set of design metrics for the first candidate design; and
generating, via the tradeoff engine, a second combined metric for the second candidate design based on a second set of design metrics for the second candidate design, wherein the second combined metric is greater than the first combined metric, thereby indicating that the second candidate design is a higher ranked design than the first candidate design.

2. The computer-implemented method of claim 1, wherein each candidate design included in the plurality of candidate designs includes a geometrical layout for developing a region of land according to a first design criterion.

3. The computer-implemented method of claim 2, wherein the first design criterion indicates a property boundary associated with the region of land within which construction is allowed to occur and outside of which construction is not allowed to occur.

4. The computer-implemented method of claim 1, further comprising generating, via an evaluation engine included in the CAD application, a different set of design metrics for each candidate design included in the plurality of candidate designs based on the set of competing design objectives.

5. The computer-implemented method of claim 4, wherein the set of competing design objectives includes a first objective function and a second objective function, and wherein an increase in value of the first objective function causes a decrease in value of the second objective function for a given candidate design.

6. The computer-implemented method of claim 1, wherein generating the design tradeoff space comprises:
generating, via the tradeoff engine, multiple axes corresponding to the multiple dimensions, wherein each axis corresponds to a different competing design objective; and
positioning, via the tradeoff engine, each candidate design within the design tradeoff space based on a corresponding set of design metrics.

7. The computer-implemented method of claim 1, wherein the first set of performance modifications is determined by:
determining a first decrease to a first design metric included in the first set of design metrics based on a first user interaction; and
determining a first increase to a second design metric included in the first set of design metrics based on a second user interaction.

8. The computer-implemented method of claim 1, wherein traversing the design tradeoff space comprises:
generating a first vector within the design tradeoff space based on a first performance modification included in the first set of performance modifications, wherein the first vector traverses along a first dimension in the multiple dimensions;
generating a second vector within the design tradeoff space based on a second performance modification included in the first set of performance modifications, wherein the second vector traverses along a second dimension in the multiple dimensions; and
generating a third vector that traverses along the first dimension and the second dimension within the design tradeoff space based on the first vector and the second vector.

9. The computer-implemented method of claim 8, wherein the first set of performance modifications indicates that a first design metric quantifying a degree to which a first design objective is met should be decreased and a second design metric quantifying a degree to which a second design objective is met should be increased.

10. The computer-implemented method of claim 1, further comprising:
generating, within the first graphical user interface (GUI), one or more GUI elements that depict a first axis in the design tradeoff space and a second axis in the design tradeoff space;
obtaining the first set of performance modifications via one or more user interactions with the first GUI; and
depicting, within the one or more GUI elements, a first traversal within a first dimension corresponding to the first axis in the design tradeoff space and a second traversal within a second dimension corresponding to the second axis in the design tradeoff space.

11. One or more non-transitory computer-readable media storing program instructions that, when executed by one or more processors, causes the one or more processors to generate designs for an urban design project via a computer-aided design (CAD) application by performing the steps of:
generating, via a geometry engine included in the CAD application, a plurality of candidate designs based on a set of design criteria and a set of competing design objectives;
generating, via a tradeoff engine included in the CAD application, a design tradeoff space that includes the plurality of candidate designs having values associated with multiple dimensions within the design tradeoff space based on different sets of design metrics, wherein each design metric included in the different sets of design metrics quantifies a degree to which a corresponding design objective is met, and wherein a first graphical user interface can be used to visualize two dimensions of the multiple dimensions at a given time;
receiving a first set of performance modifications based on one or more user interactions, wherein the first set of performance modifications specifies one or more changes to one or more of the degrees to which one or more design objectives included in the set of competing design objectives are met;
traversing, via the tradeoff engine, the design tradeoff space from a first position in the design tradeoff space associated with a first set of degrees to which the one or more design objectives are met for a first candidate design to a second position in the design tradeoff space associated with a second set of degrees to which the one or more design objectives are met based on the first set of performance modifications;
generating a second candidate design not included in the plurality of candidate designs based on the second position in the tradeoff space;
generating, via the tradeoff engine, a first combined metric for the first candidate design based on a first set of design metrics for the first candidate design; and
generating, via the tradeoff engine, a second combined metric for the second candidate design based on a second set of design metrics for the second candidate design, wherein the second combined metric is greater than the first combined metric, thereby indicating that the second candidate design is a higher ranked design than the first candidate design.

12. The one or more non-transitory computer-readable media of claim 11, wherein each candidate design included in the plurality of candidate designs includes a geometrical layout for developing a region of land according to a first design criterion.

13. The one or more non-transitory computer-readable media of claim 12, wherein the first design criterion indicates a property boundary associated with the region of land within which construction is allowed to occur and outside of which construction is not allowed to occur.

14. The one or more non-transitory computer-readable media of claim 11, further comprising the step of generating, via an evaluation engine included in the CAD application, a different set of design metrics for each candidate design included in the plurality of candidate designs based on the set of competing design objectives.

15. The one or more non-transitory computer-readable media of claim 14, wherein the set of competing design objectives includes a first objective function and a second objective function, and wherein an increase in value of the first objective function causes a decrease in value of the second objective function for a given candidate design.

16. The one or more non-transitory computer-readable media of claim 11, wherein the step of generating the design tradeoff space comprises:
generating, via the tradeoff engine, multiple axes corresponding to the multiple dimensions, wherein each axis corresponds to a different competing design objective; and
positioning, via the tradeoff engine, each candidate design within the design tradeoff space based on a corresponding set of design metrics.

17. The one or more non-transitory computer-readable media of claim 11, wherein the first set of performance modifications is determined by:
determining a first decrease to a first design metric included in the first set of design metrics based on a first user interaction; and
determining a first increase to a second design metric included in the first set of design metrics based on a second user interaction.

18. The one or more non-transitory computer-readable media of claim 11, wherein the step of traversing the design tradeoff space comprises:
generating a first vector within the design tradeoff space based on a first performance modification included in the first set of performance modifications, wherein the first vector traverses along a first dimension in the multiple dimensions;
generating a second vector within the design tradeoff space based on a second performance modification included in the first set of performance modifications, wherein the second vector traverses along a second dimension in the multiple dimensions;
generating a third vector within the design tradeoff space based on a third performance modification included in the first set of performance modifications, wherein the third vector traverses along a third dimension in the multiple dimensions; and
generating a fourth vector that traverses along the first dimension, the second dimension, and the third dimension within the design tradeoff space based on the first vector, the second vector, and the third vector, wherein the first set of performance modifications indicates that a first design metric and a second design metric should be decreased and a third design metric should be increased.

19. The one or more non-transitory computer-readable media of claim 11, further comprising:
obtaining a first performance modification via a first user interaction with the first graphical user interface (GUI);
obtaining a second performance modification via a second user interaction with the first GUI;
generating a first GUI element that depicts a first traversal within a first dimension of the design tradeoff space based on the first performance modification; and
generating a second GUI element that depicts a second traversal within a second dimension of the design tradeoff space based on the second performance modification.

20. A system, comprising:
one or more memories storing a computer-aided design (CAD) application; and
one or more processors that, when executing the CAD application, are configured to perform the steps of:
generating, via a geometry engine included in the CAD application, a plurality of candidate designs based on a set of design criteria and a set of competing design objectives;
generating, via a tradeoff engine included in the CAD application, a design tradeoff space that includes the plurality of candidate designs having values associated with multiple dimensions within the design tradeoff space based on different sets of design metrics, wherein each design metric included in the different sets of design metrics quantifies a degree to which a corresponding design objective is met, and wherein a first graphical user interface can be used to visualize two dimensions of the multiple dimensions at a given time,
receiving a first set of performance modifications, wherein the first set of performance modifications specifies one or more changes to one or more of the degrees to which one or more design objectives included in the set of competing design objectives are met,
traversing, via the tradeoff engine, the design tradeoff space from a first position in the design tradeoff space associated with a first set of degrees to which the one or more design objectives are met for a first candidate design to a second position in the design tradeoff space associated with a second set of degrees to which the one or more design objectives are met based on the first set of performance modifications,
generating a second candidate design not included in the plurality of candidate designs based on the second position in the tradeoff space;
generating, via the tradeoff engine, a first combined metric for the first candidate design based on a first set of design metrics for the first candidate design, and
generating, via the tradeoff engine, a second combined metric for the second candidate design based on a second set of design metrics for the second candidate design, wherein the second combined metric is greater than the first combined metric, thereby indicating that the second candidate design is a higher ranked design than the first candidate design.

* * * * *

UNITED STATES PATENT AND TRADEMARK OFFICE
CERTIFICATE OF CORRECTION

PATENT NO. : 12,141,504 B2
APPLICATION NO. : 16/184972
DATED : November 12, 2024
INVENTOR(S) : David Benjamin et al.

It is certified that error appears in the above-identified patent and that said Letters Patent is hereby corrected as shown below:

On the Title Page

(56) References Cited:
Please delete "Erreira et al., "Urbane: A 3D Framework to Support Data Driven Decision Making in Urban Development", IEEE Conference on Visual Analytics Science and Technology 2015, pp. 97-104." and insert --Ferreira et al., "Urbane: A 3D Framework to Support Data Driven Decision Making in Urban Development", IEEE Conference on Visual Analytics Science and Technology 2015, pp. 97-104.--.

Signed and Sealed this
Fourth Day of March, 2025

Coke Morgan Stewart
*Acting Director of the United States Patent and Trademark Office*